US008949882B2

(12) United States Patent
Sherwin et al.

(10) Patent No.: US 8,949,882 B2
(45) Date of Patent: Feb. 3, 2015

(54) SYSTEM AND METHOD FOR ENABLING CONTENT PROVIDERS TO IDENTIFY ADVERTISING OPPORTUNITIES

(75) Inventors: Jeffrey Sherwin, Scarsdale, NY (US); Carrie Leigh Shaw, Toronto (CA); Nickolas James Heudecker, San Jose, CA (US)

(73) Assignee: This Technology, Inc., Denver, CO (US)

( * ) Notice: Subject to any disclaimer, the term of this patent is extended or adjusted under 35 U.S.C. 154(b) by 1445 days.

(21) Appl. No.: 12/274,906

(22) Filed: Nov. 20, 2008

(65) Prior Publication Data
US 2009/0150930 A1 Jun. 11, 2009

Related U.S. Application Data

(60) Provisional application No. 60/992,946, filed on Dec. 6, 2007.

(51) Int. Cl.
*H04N 7/10* (2006.01)
*H04N 7/025* (2006.01)
(Continued)

(52) U.S. Cl.
CPC .......... *H04N 7/17318* (2013.01); *G11B 27/031* (2013.01); *H04N 21/25891* (2013.01); *H04N 21/26233* (2013.01); *H04N 21/26258* (2013.01); *H04N 21/26291* (2013.01); *H04N 21/812* (2013.01)
USPC ............................................... 725/32; 725/36

(58) Field of Classification Search
USPC ........ 725/32, 35, 36; 705/14.66, 14.67, 14.68
See application file for complete search history.

(56) References Cited

U.S. PATENT DOCUMENTS 7,568,209 B1 *   7/2009  Addington et al. ............. 725/32
2004/0070690 A1 *   4/2004  Holtz et al. .................... 348/581
(Continued)

OTHER PUBLICATIONS

SCTE 130-1r5.v1, Society of Cable Telecommunications Engineers, Jan. 10, 2008.

(Continued)

*Primary Examiner* — Ngoc Vu
(74) *Attorney, Agent, or Firm* — Lowenstein Sandler LLP

(57) ABSTRACT

A computer implemented method for enabling content providers to identify and customize placement opportunities is disclosed, comprising the steps of processing instructions to customize a pre-existing at least one of an audio and video datastream comprising at least one predefined time interval for content, identifying at least one time interval for a placement opportunity in the at least one of an audio and video datastream; altering at least one characteristic of the at least one time interval for a placement opportunity in accordance with the instructions; assembling the altered at least one time interval for a placement opportunity and at least one time interval for content into a list that represents an altered at least one of an audio and video datastream; and delivering the list to a distribution system for playing the altered at least one of an audio and video datastream. The at least one time interval for a placement opportunity may distinct from or coincident with the at least one time interval for content. The placement opportunity may be at least one of content and an advertising placement opportunity. The content may be entertainment content comprising at least one of video, audio, and interactive overlays. The at least one characteristic may be the duration of or the number of the at least one time interval for a placement opportunity. The list may be one of a playlist and a schedule.

34 Claims, 12 Drawing Sheets

(51) Int. Cl.
*H04N 7/173* (2011.01)
*G11B 27/031* (2006.01)
*H04N 21/258* (2011.01)
*H04N 21/262* (2011.01)
*H04N 21/81* (2011.01)

(56) References Cited

U.S. PATENT DOCUMENTS

| | | | |
|---|---|---|---|
| 2007/0055983 A1* | 3/2007 | Schiller et al. | 725/32 |
| 2008/0066095 A1 | 3/2008 | Reinoso | |
| 2008/0069350 A1 | 3/2008 | Reinoso et al. | |
| 2008/0250448 A1* | 10/2008 | Rowe et al. | 725/32 |
| 2008/0307454 A1* | 12/2008 | Ahanger et al. | 725/36 |
| 2009/0225983 A1 | 9/2009 | Reinoso et al. | |

OTHER PUBLICATIONS

CableLabs Asset Distribution Interface Specification, Version 1.1, MD-SP-ADI1.1-I04-060505, Cable Television Laboratorie, 2006.

ADI 2.0 Specification Asset Inventory Messages, MD-SP-ADI2.0-I02-060505, Cable Television Laboratorie, 2006.

* cited by examiner

74 ↘

New Ad Unit

76 — Description: [                    ]

78 — Duration:  ○ Fixed  ○ Flexible
   [45]   Min: [45]
          Max: [45]
          Best: [45]

80 — Number of
     Opportunities: ○ Fixed  ○ Flexible
   [45]   Min: [45]
          Max: [45]
          Best: [45]

82 — Interactivity: [Select ▼]
84 — Overlay:      [Select ▼]
86 — Location:     [Select ▼]
88 — Start Date:   [       ]
90 — Start Date:   [       ]
92 — Scope:        [Select ▼]

94 — [Save »]   [Cancel »] — 96

FIG. 6

| Tasks for the Playlist | Playlist: Rules |
|---|---|
| Rules | |

O My Time Zone
EDT (GMT -3:00)

100 — Name: [                    ]

102 — Description: [                    ]

104 — Status: [Draft ▼]

Broadcast Rules:

106 — Activation Date: [           17]

108 — Expiry Date: [           17]

110 — Category Path:
/Movies A-Z/ - This Tech
/Movies/Action/ - This Tech
/Movies/Comedy/ - This Tech
/Movies/Drama/ - This Tech
/Movies/Sci-Fi/ - This Tech
/Movies/Suspense/ - This Tech
/New Release/ - This Tech 112 — Markets: [National]

114 — Devices:
☐ All Set-tops         ☐ All Broadband
☐ SA1850               ☐ Apple Phone
☐ SA4200               ☐ Apple iPod
☐ SA8400               ☐ WMP11
☐ DVR5000              ☐ Real11

116 — ☑ This playlist can contain ads units
118 — Allow Interstitial? ☐
120 — Allow Trick Play? ⊙ On Playlist ○ On Content ○ No Trickplay
122 — Allow Pause?      ⊙ On Playlist ○ On Content ○ No Pause 124 — Bitrate:
SD 480i
SD 480p
SD 576i
SD 576p
HD 720p
HD 1080i
HD 1080p
HD 2160p 126 — [ Save » ]    [ Reset » ] — 128

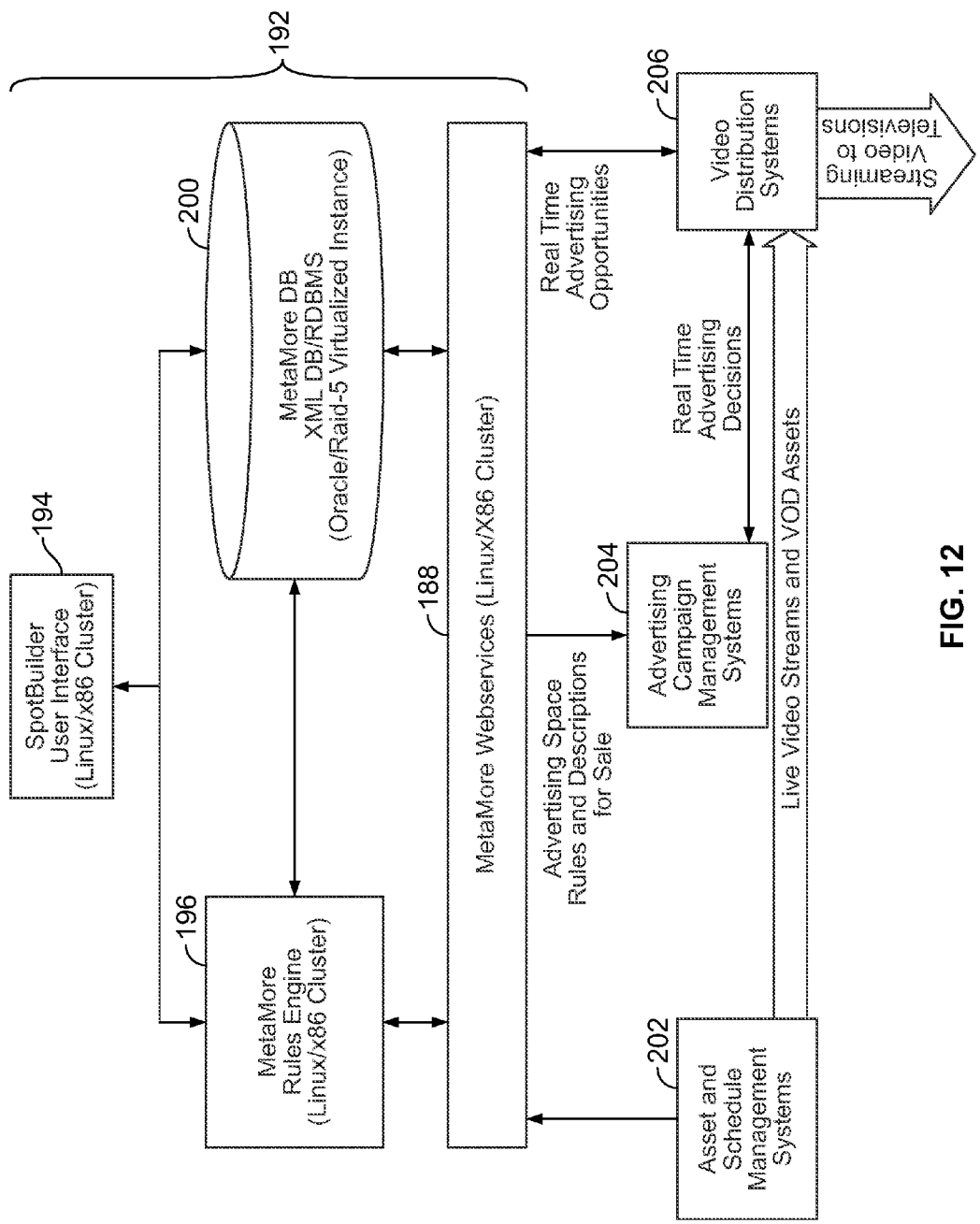

SYSTEM AND METHOD FOR ENABLING CONTENT PROVIDERS TO IDENTIFY ADVERTISING OPPORTUNITIES

CROSS-REFERENCE TO RELATED APPLICATIONS

This application claims the benefit of U.S. provisional patent application No. 60/992,946 filed Dec. 6, 2007, the disclosure of which is incorporated herein by reference in its entirety.

FIELD OF THE INVENTION

The present invention relates generally to service provider video networks, and more particularly to a method and system for identifying advertisement opportunities in a service provider video data stream.

BACKGROUND OF THE INVENTION

The Internet, because of its relative interactivity with a user, provides rich and plentiful advertising opportunities. The Internet model provides for advertisements that are accountable and provide for direct response and interactivity. When a user accesses a commercial Web site, the user may be greeted with a popup advertisement, portions of the viewing screen being occupied by fixed or animated advertisements, scrolling banners, or fixed or moving advertisements that appear when the user clicks on links or performs steps in a purchase. Internet advertisement opportunities appear based on space, time, content, and user context and may be highly non-linear (i.e., the user chooses to initiate the playing of content and in response, the content starts).

In contrast, traditional advertising for broadcast and cable television and on radio has followed a linear model. Programming may be linear in the sense that a program begins and is streamed and in progress when a user chooses to view entertainment content. FIG. 1 illustrates the differences and similarities between a linear and nonlinear model. Entertainment content 2, when processed as a digital data stream over cable networks, may be divided into a number of time intervals. The time intervals 4 comprise the time reserved for the viewed program (content), such as "Golden Girls." The intervals 6, 8, 10, represent sections of time reserved for advertisements or "avails." These "avails" may be viewed advertisement placement opportunities. A placement opportunity is a construct that represents an opportunity to insert an advertisement or entertainment content, and defines the rules for that opportunity, such as its duration, interactivity, ownership, and technical constraints.

In linear over-the-air or traditional cable TV broadcasting, each of the intervals 6, 8, 10 are known as breaks with no distinction of ordering. Advertisement time may occur before, during, or after the intervals 4 in the breaks, each break comprising a "pod," each "pod" containing one or more "avails." The list of programs and breaks comes to a service provider in a schedule, and may provide additional information as to which entity, e.g., a network, an operator, or other entity, owns each of the avails. A traffic and billing system then reads the schedule and identifies which network, operator, or other entity has the right to place an advertisement during a particular avail of a given pod during a given break. Existing cable systems provide static sales—e.g., a 30 second spot in a particular geographic market which is inserted into one or more of the breaks 6, 8, 10.

In non-linear systems, such as Video-on-Demand, the intervals 6, 8, 10 take on new meaning. The interval 6 is called a pre-roll, i.e., the space in a video that occurs immediately after a user clicks to start a VOD video. The interval 10 is known as a post-roll, i.e., the space after all of the VOD video segments have finished playing. The intervals 8 may be mid-rolls, i.e., mini-breaks in the middle of a VOD video, or may be interstitials, i.e., pod-like locations between consecutive VOD video segments. All of the intervals 6, 8, 10 in such playlists are ripe for the insertion of advertisements, i.e., advertisement placement opportunities.

In the traditional model for the placement of ads in television programming, avails are specified by a simple combination of channel and time and decided weeks ahead of broadcast. However, new cable content delivery systems allow for advertising spots of many different durations, allow for different levels of interactivity (e.g., polling or linking) through the use of buttons on a remote control, may be defined by geography, etc. In a world where TV viewing is becoming increasingly non-linear (e.g., video-on-demand (VOD), networked-based personal video recorders (PVR), interactive programs) a key goal of advertisement opportunity placement systems is to determine how to define placement opportunities that are non-deterministic and manifest dynamically Advanced advertising needs to accommodate advertisement placement opportunities that are invoked by user events, which may include anything from playback of a VOD title to pausing one's DVR. As the scope of potential placement opportunities expands accordingly, it becomes necessary to precisely define those placement opportunities with attributes representing relevant business rules. These may be used to specify such things as inventory splits, quantity, duration, and position of ad breaks (pre-roll, mid-roll, post-roll); placement of pause ads and overlays; and levels and types of interactivity.

On the Internet, the content publisher and the advertiser are often isolated from one another, with the advertising network acting as an intermediary. On TV, the advertising network was the national network, the cable network, or the cable operator, that had fixed avails. However, emerging advanced advertising standards for dynamic television provide an opportunity for content providers to derive value from the cable operators ad placement infrastructure by creating new and more flexible advertising inventory (i.e., Potential Viewership*Placement Opportunities=Advertising Inventory). This new business model imposes unique technical challenges: unlike the Internet, where browsers access/display content and then are separately "referred" to a shared ad network, the cable television infrastructure needs to select and assemble both the advertisement and the content together in the network and deliver the combined result to customers' set top boxes. For this to work, cable television advanced advertising networks must at least partially operate within the infrastructure of a Multiple System/Service Operator (MSO—a cable TV organization that owns more than one cable system and may prove broadband Internet service). To achieve optimal addressability and user experience and achieve bandwidth efficiencies, advertising service elements and digital delivery components need to be located close to the edge of the network, i.e., at or near set top boxes. Decisions need to be made based upon relevant context (infrastructure, platform, content, geography, demographics, etc), which are applicable to non advertisements as well (e.g., suggested content). By making placement decisions and insertions at the time of a user request—or even at the appropriate times during content playout—fully dynamic ad placement may be achieved.

Accordingly, what would be desirable, but has not yet been provided, is a method and system that enables a provider of content with the ability to dynamically identify and customize advertisement placement opportunities for dynamic decisions, and distribute advertisement placement opportunities according to market, technical, and customer needs.

SUMMARY OF THE INVENTION

The above-described problems are addressed and a technical solution is achieved in the art by providing a computer implemented method and system for enabling service providers to identify and customize placement opportunities, comprising the steps of processing instructions to customize a pre-existing at least one of an audio and video datastream comprising at least one predefined time interval for content; identifying at least one time interval for a placement opportunity in the at least one of an audio and video datastream, the at least one time interval for a placement opportunity being one of distinct from and at least partially overlapping the at least one time interval for content; altering at least one characteristic of the at least one time interval for a placement opportunity in accordance with the instructions; assembling the altered at least one time interval for a placement opportunity and at least one time interval for content into a list that represents an altered at least one of an audio and video datastream; and delivering the list to a distribution system for playing the altered at least one of an audio and video datastream. The at least one time interval for a placement opportunity may distinct from or coincident with the at least one time interval for content. The placement opportunity may be at least one of content and an advertising placement opportunity. The content may be entertainment content, the entertainment content comprising at least one of video, audio, and interactive overlays.

The at least one characteristic may be the duration or number of the at least one time interval for a placement opportunity. The at least one characteristic may be at least one of an overlay real estate, ownership, sales relationships, and interactive rights of the at least one time interval for a placement opportunity.

The step of altering comprises at least one of changing, adding to, and subtracting from the characteristic of the at least one time interval for a placement opportunity. Changing at least one characteristic may be based on one of different markets, the nature of the content, from Where the content is being accessed, the type of devices employed by a user, time of day, day of the week, geographic area, and demographic profile. The at least one time interval for a placement opportunities may corresponds to one of breaks, entertainment content, pre-rolls, post-rolls, mid-rolls, interstitials, pauses, and video-on-demand requests. The list may be one of a playlist and a schedule.

The method may further comprise inserting a decorator for housing placement opportunities that may be matched to content about the content to create the list and publishing the list. The list may be published using one of a content information service (CIS), a placement opportunity information service (POIS) that conforms to the SCTE-130 standard, and insertion directly into an Asset Distribution Interface (ADI).

The method may further comprise the step of informing the distribution system to stream the altered at least one of an audio and video datastream. The at least one placement opportunity is destined for one of video-on-demand based advertising, linear based advertising, rotation groups, and subscriber-based addressing for advertising or content tailoring. The distribution system may be a video distribution system. The video datastream may be intended for television transmission.

BRIEF DESCRIPTION OF THE DRAWINGS

The present invention will be more readily understood from the detailed description of exemplary embodiments presented below considered in conjunction with the attached drawings, of which:

FIG. 6 is a screen shot of a MetaMore system "Ad Unit" screen that is displayed to a system operator, in accordance with an embodiment of the present invention;

FIG. 7 is a screen shot of the MetaMore system "Playlist: Rules" screen that is displayed to a system operator, in accordance with an embodiment of the present invention;

FIG. 10 is a screen shot of a "Manage Trigger" screen that is displayed to a system operator, in accordance with an embodiment of the present invention;

FIG. 12 is a block diagram of the MetaMore system hardware architecture, constructed in accordance with an embodiment of the present invention.

It is to be understood that the attached drawings are for purposes of illustrating the concepts of the invention and may not be to scale.

DETAILED DESCRIPTION OF THE INVENTION

Advertisement (or "Ad") campaigns are valued based on a relationship between of audience measurement (potential viewership) and placement opportunities for ads or "avails," which together define advertising inventory. In general, advertising inventory (i.e., total possible sales opportunities) may be defined by the following relationship:

$$(\text{Potential Viewership} * \text{Placement Opportunities} = \text{Advertising Inventory}) \qquad (1)$$

Figure 1:
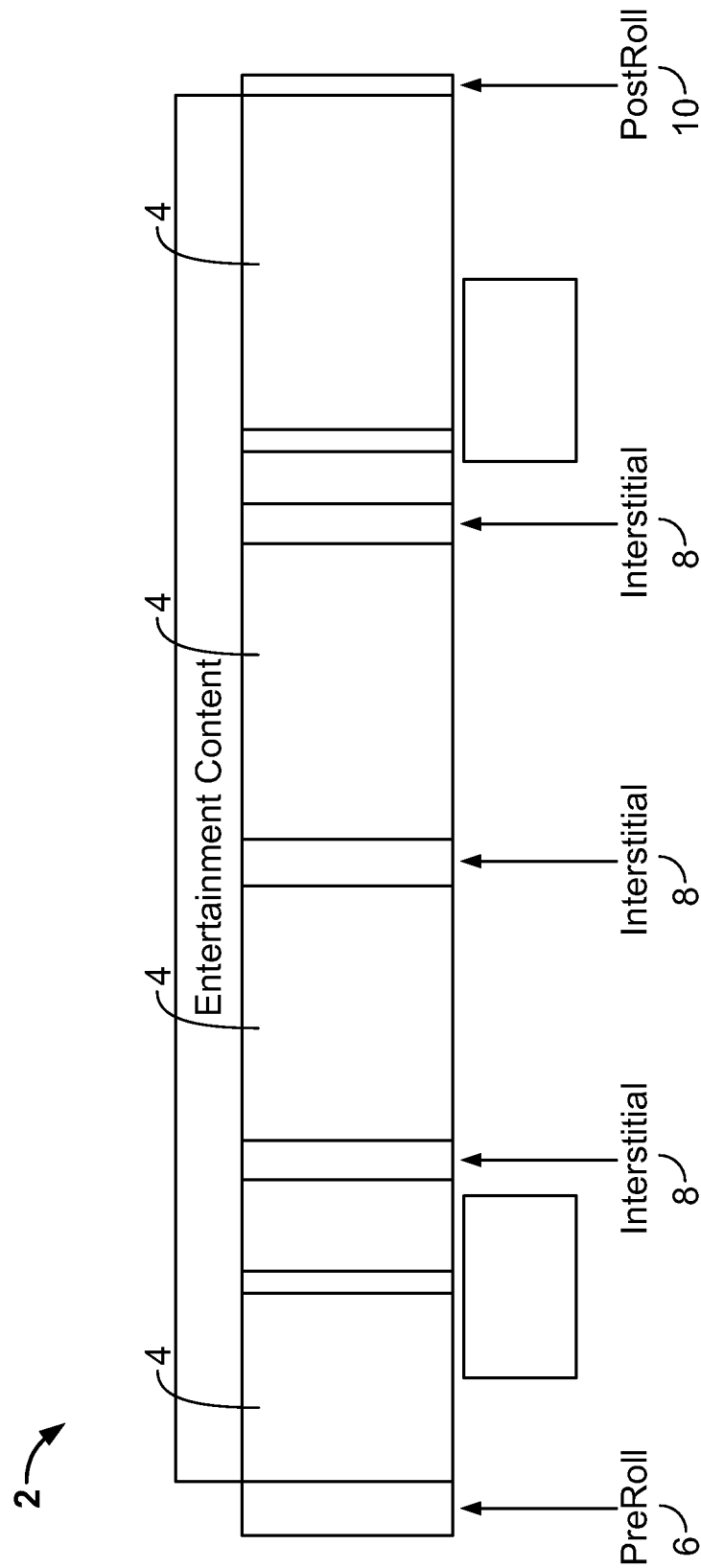
FIG. 1 is a diagram depicting the contents of a cable video data stream in the prior art.
Figure 2:
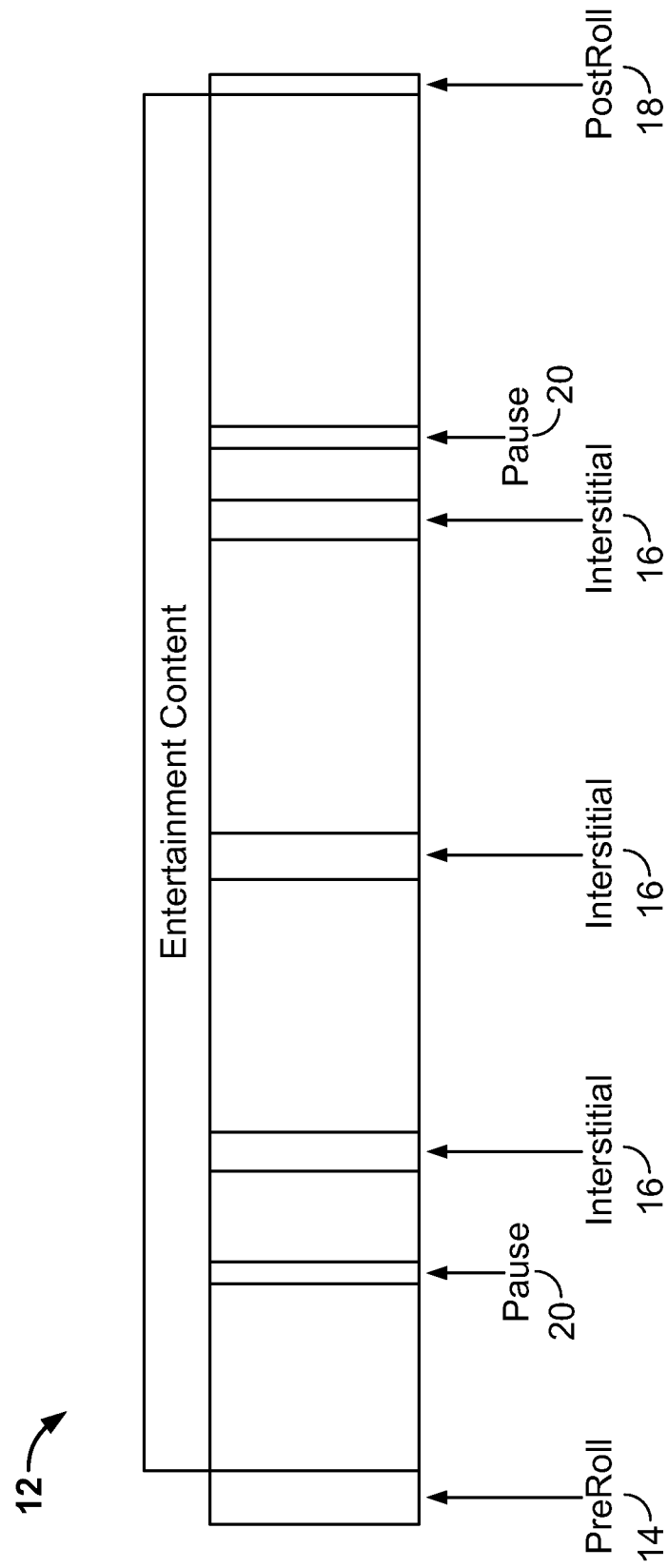
FIG. 2 is a diagram depicting the contents of a cable linear or video-on-demand (VOD) data stream according to an embodiment of the present invention.

Content providers and distributors need tools to define and manage placement opportunities in order to maximize yield, price, sell-through, etc. Just as an airline reservation system fills a plane by allocating classes of seats and by matching passengers to seats at a variable fare that maximizes revenue, it is possible to dynamically define new placement opportunities (seats) which may be filled with ads (passengers) in such a way as to optimize advertisement campaign goals. Addressability is typically described in terms of time, place and subscriber attributes (e.g., subscription level, demographics, etc.). By incorporating the concept of enhanced placement opportunities defined and subsequently applied in the context of the content itself, MSOs and their content partners are better able to maximize the value of their inventory by identifying and addressing advertising opportunities consistent with market demand, consumer performance, and platform capability. The result is an increase in potential advertising revenue per unit of advertisement sold and a decrease in the value erosion of traditional advertisement spots. The goal implied by Equation 1 is to maximize advertising inventory. Traditionally, viewer ratings services, such as Nielson, provide the data for potential viewership. The present invention concentrates on manipulating placement opportunities and their distribution. Referring now to FIG. 2, a digital video data stream 12 is graphically depicted according to an embodiment of the present invention. The digital data stream 12 is similar to the one depicted in FIG. 1, where the intervals 14, 16, 18 represent fixed time breaks for linear programming, or fixed/time varying pre-rolls 14, post-roll 18, and the interstitials or mid-lolls 16, with additional "pauses" 20 (i.e., a system initiated or user-initiated pausing or freezing of the playback) interspersed therebetween for video-on-demand (VOD). Although the broadcast or cable network may have indicated pre-rolls 14, post-rolls 18, and the interstitials or mid-rolls 16 of fixed duration (e.g., 30 seconds each), the method and system of the present invention are configured to manipulate the data stream 12 to customize it for a given market location and even down to the granularity of a single viewer. Although a network defines a 30 second spot for linear breaks 14, 16, 18, an MSO may buy that space and break it into two 15 second opportunities for some distribution. For VOD, the intervals 14, 16, 18 may be broken into smaller intervals, or increased in length beyond 30 seconds by the system and method of the present invention. Advertisements may also be inserted during the pauses 20 that a user may input interactively to a set top box or even be inserted during scene changes in addition to the varying pre-rolls 14, post-rolls 18, and the interstitials or mid-rolls 16 present in the data steam 12.

For example, for a video-on-demand (VOD) application, for the majority of movies played for a given MSO in all cities, a 30-second pre-roll spot is specified, but for a pre-roll in say, Kansas City, Mo., the 30-second pre-roll may be expanded to 45 seconds. In another example, while the majority of markets for an MSO play a show sequentially, in New York, the MSO may request that a show be made interactive (include pauses, rewind, etc.). Further, if a given show is streamed in high definition (HD) format, but the commercials are in standard definition, the present invention would allow for the market-specific insertion of HD commercials. In summary, the digital video data stream 12 may be manipulated by system and method according to an embodiment of the present invention by identifying advertisement placement opportunities in the data stream 12, so that MSOs may sell advertising spots in different markets based on a variety of parameters, including the nature of the content, from where the content is being accessed, what device may be using the data stream 12. Information may be based on what is known about the subscribers in a market as a whole, or even down to the granularity of specific subscribers. Advertisements made available to the subscriber may be custom overlayed with customer or market specific advertisements.

In an embodiment, not only may the intervals 14-20 be manipulated dynamically, but also during the entertainment content intervals 21. For example, after a plurality of entertainment content intervals have been played, the viewer may dynamically select from a list variable outcomes in a final entertainment content interval, or additional entertainment content intervals may be added dynamically. The entertainment content may be inserted based upon some set of opportunities and decisions.

In still another embodiment, if a cable channel is broadcasting audio-only (e.g., cable radio stations), systems and methods according to embodiments of the present invention are configured to identify opportunity for inserting advertisements between songs, or overlay the audio entertainment content with visuals of adds or images that are relevant to the audio being played. Video banners may be overlayed over entertainment (video or audio) content. Thus, the systems and methods according to embodiments of the present invention are adapted to also identify placement opportunities for inserting or overlaying entertainment, advertisement, or other content between or during entertainment content.

The present invention may identify not only advertisement and content placement opportunities, but also identify overlay real estate, ownership, sales relationships, and interactive rights.

The present invention is embodied in a product: MetaMore. The systems and related methods of the present invention, herein referred to as "the MetaMore system," are configured to provide for dynamic advertising or content placement opportunities within digital video data streams. The MetaMore system is vendor and system agnostic, offering dynamic delivery of playlists (a video stream that comprises content and opportunities for advertisements), advertising avails, and related metadata. The MetaMore system is compatible with industry-wide advertising sales and delivery systems, including campaign managers, content streamers, and traffic and billing systems. At a high level, the MetaMore system offers:

Playlist management: a rules-based video stream comprising specific entertainment content, such as a feature or several episodes within a series, and designated advanced advertisement insertions, including breaks, entertainment content, pre, post, mid rolls, interstitials, interactives, and channel tunes;

Advertising placement opportunity management, based on the SCTE-130 and CableLabs ADI1.1 and 2.0 standards for VOD (ADI will be defined hereinbelow) and SCTE-118 for linear content, and the ability to apply them within a playlist based on position, ownership and sales rights; and The distribution of playlists and schedules across multiple endpoints, effectively reducing the switching costs of campaign managers and ad decision servers.

The MetaMore system is configured to conform to the SCTE-130 standard. SCTE-130 provides a standardized and extensible message based interface defining a minimal set of cooperating logical services necessary to communicate placement opportunities, placement decisions, and placement related event data necessary for accountability measurements. SCTE-130 defines an extensible framework of interfaces among a set of advertising system logical services. The SCTE-130 standard encompasses the following:

1. A minimal set of cooperative logical services needed to implement advanced addressable advertising systems;
2. The core data types and extensible message framework forming a vocabulary needed to communicate among the defined logical services;
3. The interfaces among these logical services using the core data types and messages; and
4. Mechanisms for extensibility that allow innovation while preserving backward compatibility with already deployed systems—thereby reducing the complexity for incorporating new features within the standard.

The normative parts of this standard define mechanisms for integrating systems implementing features such as:

VOD based advertising

Lineal based advertising

Enhanced advertising capabilities such as ad rotation groups (rotation groups refer to placement opportunities that run in rotation so that the same add is not viewed again immediately)

Subscriber-based addressing for advertising or content tailoring

Extension points for more advanced advertising or addressing features

Logical services that are implemented as one or more physical systems created by the same vendor Deployment of a logical service that may simultaneously include systems from one or more vendors An implementation that may incorporate one or more of the defined logical services and interfaces The SCTE-130 standard defines a set of logical services comprising an advanced advertising system. Each logical service may itself be a complex system. Some or all of the following logical services are used by or interact with the MetaMore system of the present invention.

Ad Management Service (ADM)

The Ad Management Service (ADM) defines messages in support of ad insertion activities. The primary consumer of these messages is an Ad Decision Service (ADS—to be described hereinbelow). The message interfaces exposed by an ADM allow for both preconfigured ad decisions as well as real-time fulfillment models. An ADM implementation may incorporate some simple ad selection rules (e.g., ad rotations) but more complex ad decisions are the responsibility of an ADS.

Ad Decision Service (ADS)

The Ad Decision Service (ADS) determines how advertising content is combined with non-advertising (i.e., entertainment) content assets. The decisions made by an ADS may be straightforward (i.e., specific ad content placed at a specific time in a specific asset) or arbitrarily complex (based on subscriber data, advertising zone, etc.).

Content Information Service (CIS)

The Content Information Service (CIS) manages metadata describing all the assets (both advertising assets and non-advertising assets) available to the other SCTE-130 logical services. The CIS provides query and notification interfaces to the other logical services. The query service is available on an ad-hoc basis and may be called by any other logical service at any time without any prior registration. Queries specify values or patterns to be sought in the query message metadata and the specified matching information (or an error indication) is returned in a response message.

Placement Opportunity Information Service (POIS)

The Placement Opportunity Information Service (POIS) holds, maintains, or retains descriptions of placement opportunities. The POIS may also contain attributes and constraints for each placement opportunity, platform compliance, rights, and policies of the content in which the placement opportunity exists. These placement opportunities are content specific, therefore attributes and constraints may vary by network, geographic region, or other content distribution dimension.

Subscriber Information Service (SIS)

The Subscriber Information Service manages the per-subscriber information relevant to ad placement decisions. The SIS provides mechanisms surrounding privacy issues.

Figure 3:
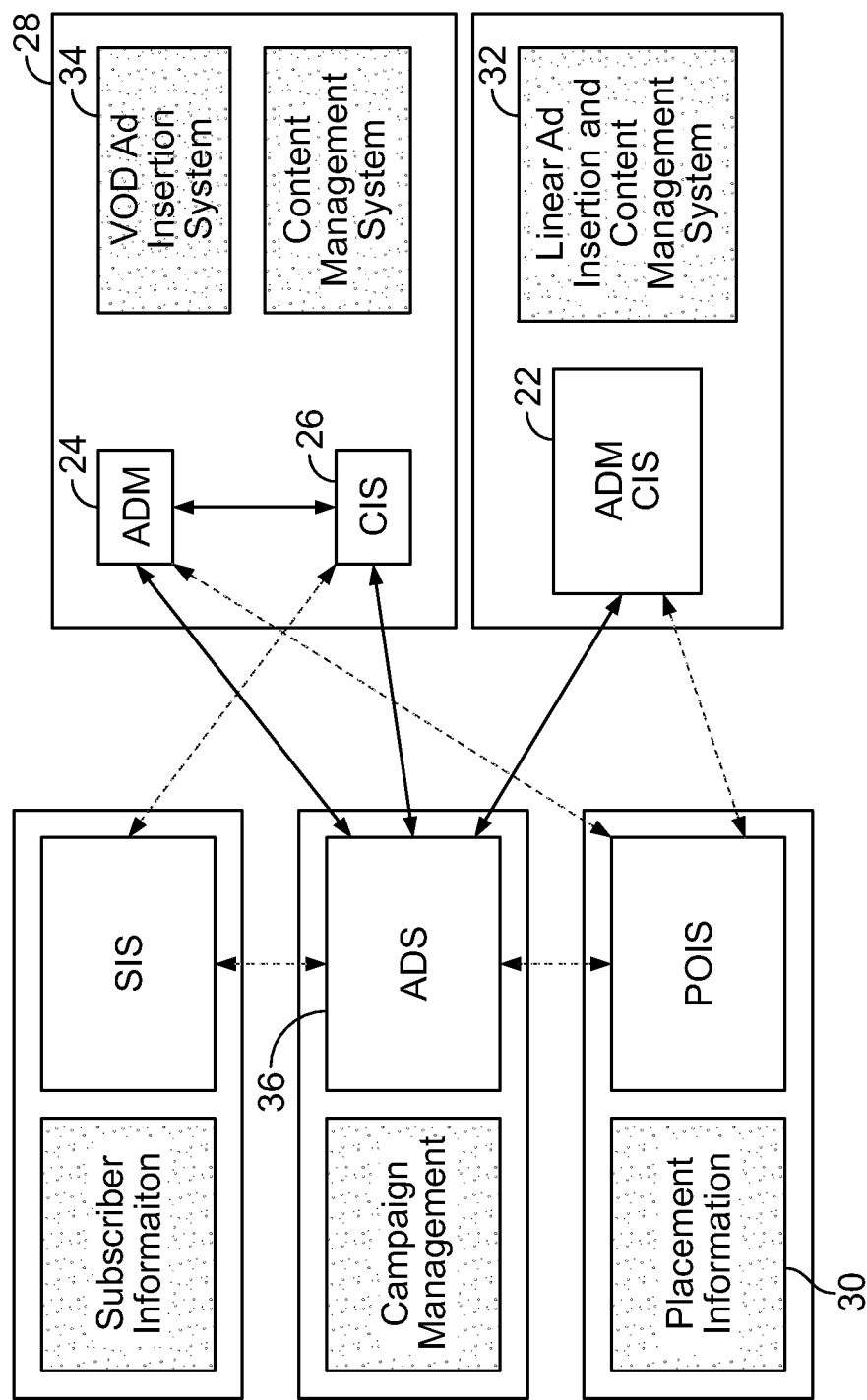
FIG. 3 depicts an exemplary configuration of the logical services described by the SCTE-130 standard.

Many possible configurations of the logical services described by the SCTE-130 standard. FIG. 3 illustrates an exemplary configuration with a number of variations of deployment among the services. The actual configuration employed by the MetaMore system in accordance with one embodiment of the present invention is described hereinbelow with reference to FIG. 4. In one case an ADM 22 is shown as a standalone service while in another an ADM 24 and a CIS 26 are combined into a single physical server 28. Many other combinations beyond the illustration in FIG. 3 are possible. All communication lines shown in FIG. 3 are message sequences defined by the various parts of the SCTE-130 standard.

In FIG. 3, the systems shown as boxes 29 implement the functions such as detecting placement opportunities (30) (sometimes referred to as cue messages or placement opportunity triggers), inserting ads into a linear stream (32) or processing orders from advertisers for certain type of programming. These systems are implemented by a multitude of vendors and vary widely in the features that they provide. The logical systems of this document (shown in the white boxes) provide a standard set of public interfaces to expose the relevant functions of their associated private systems. In this way, the details of how and where content is stored, for example, are kept within a vendor's content storage system and the associated CIS makes the metadata regarding this content available to other logical services.

FIG. 3 also illustrates the potential many-to-many relationships among these services. In the example, the ADM 24 associated with the hypothetical VOD system 34 is communicating with a single ADS 36 while the ADS 36 is communicating with ADM's 22, 24. FIG. 3 is just one example of the many possible configurations.

The MetaMore system as a software application focuses on the construction and distribution of playlists and schedules: entities that marry together opportunities for advertisements with content streams that make sense to viewers, operators, and content providers. Typically, the MetaMore system distributes this information to a downstream system, such as an ADS, ADM, or Campaign Manager (or any combination thereof) which will ultimately deliver the content to an end user.

Figure 4:
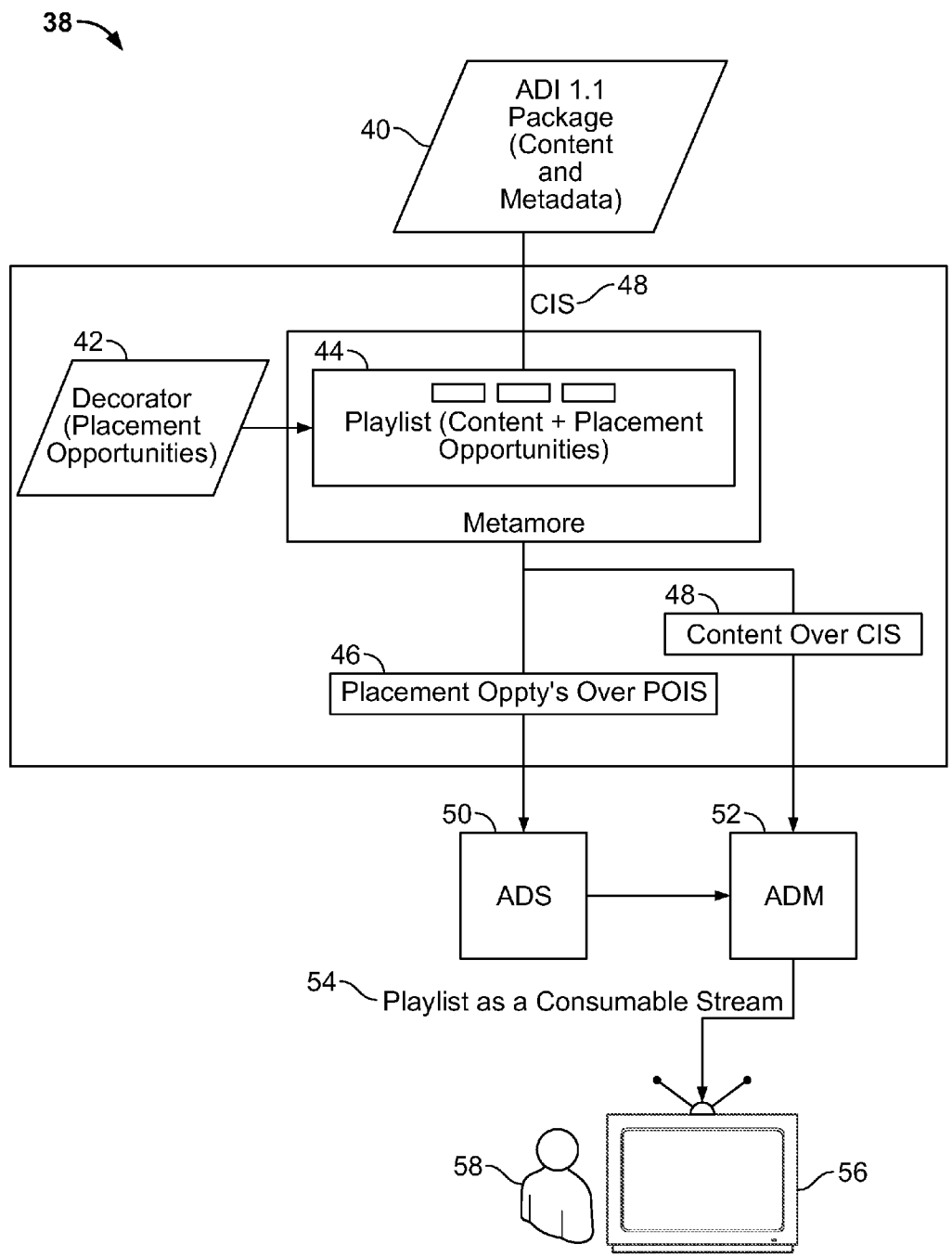
FIG. 4 is a block diagram depicting the overall data flow between entities of the MetaMore system and a viewer, constructed in accordance with an embodiment of the present invention.

Referring now to FIG. 4, the overall data flow between entities of the MetaMore system and a viewer is depicted, constructed in accordance with an embodiment of the present invention. The dataflow 38 includes an Asset Distribution Interface (ADI 1.1/2.0) package 40, decorators 42, playlists 44 constructed using the MetaMore system, a POIS 46, a CIS 48, an ADS 50, an ADM 52, a playlist as a consumable stream on a set top box 54, a monitor 56, e.g., for a television or computer, and an end user 58. The ADI 1.1/2.0 package 40 is a software standard originating out of CableLabs which provides a means by which assets (content as well as metadata describing that content) are transported from a provider into an asset management system. ADI1.1 is currently the de facto standard, but will eventually be replaced by ADI2.0. The decorator (or content decorator) 42 is a construct to house placement opportunities for the purposes of making mass changes based upon rules that may be matched to content to create playlists, i.e., Content+Decorator=Playlist or Schedule. The playlist (schedule) 44 is a video stream that comprises content and opportunities for advertisements. Delivered to an ADS/ADM integration point, the playlist 44 is turned into a stream of content and advertisements. Typically, the MetaMore system constructs and distributes playlists or schedules, i.e., entities that marry together opportunities for advertisements with content streams that make sense to viewers, operators, and content providers, to a downstream system, such as the ADS 50, the ADM 52, or a Campaign Manager (not shown) (or any combination thereof) which ultimately delivers content to the end user 56.

Figure 5:
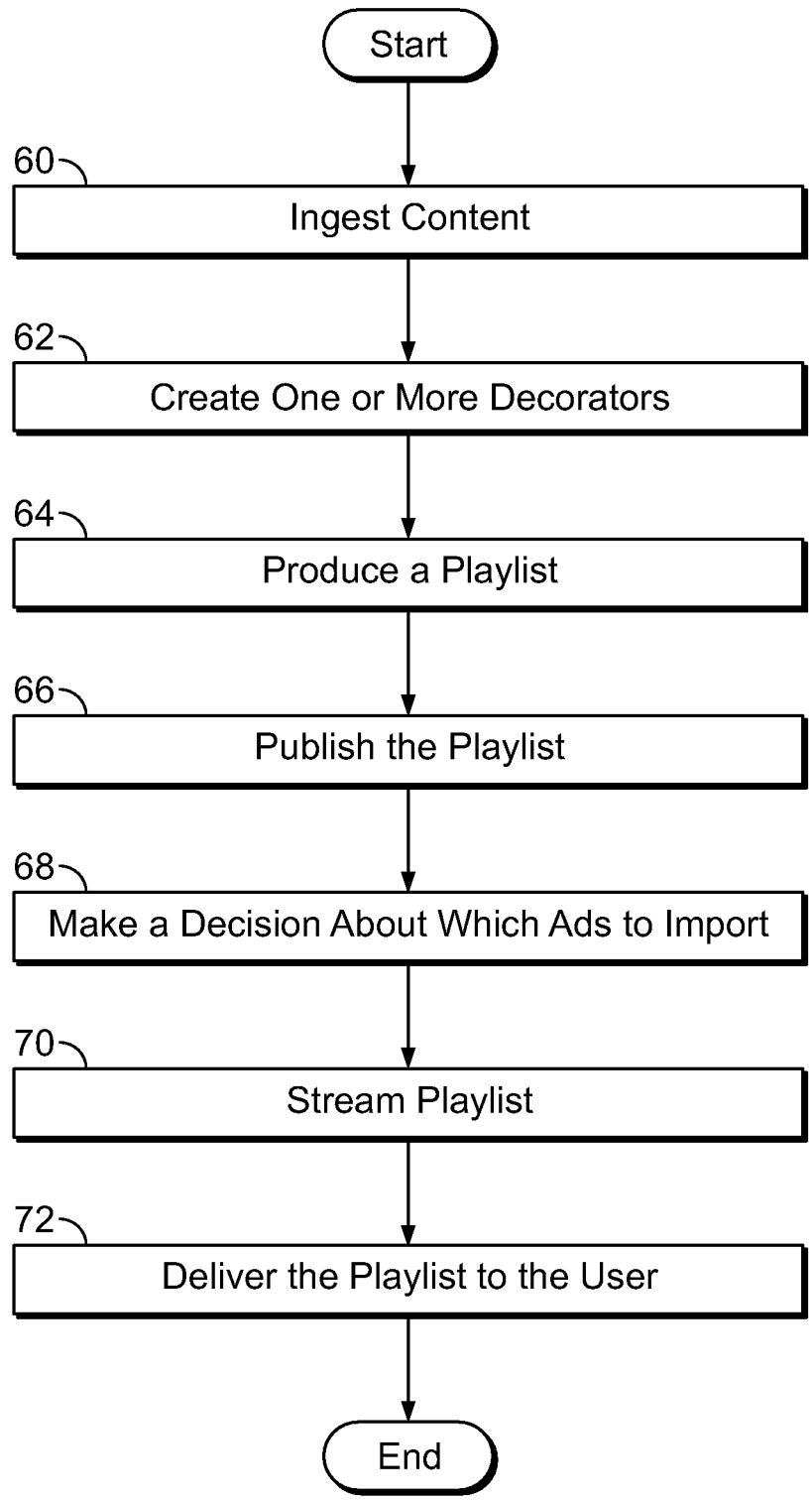
FIG. 5 is a flow chart depicting the steps taken by the present invention to identify and transmit placement opportunities according to the data flow of FIG. 4.

Referring now to FIGS. 4 and 5, the flow diagram depicted in FIG. 4 may be described by the following steps, constructed in accordance with an embodiment of the present invention. At step 60, the MetaMore system ingests content that is needed to construct the playlist 44 via ADI 1.1/2.0 package 40 over CIS 48. At step 62, the MetaMore system creates one or more decorators 42 to wrap around the content. At step 64, the MetaMore system produces the playlist 44 based on a combination of content and the decorators 42. At step 66, the MetaMore system publishes the playlist 44 over two standards: POIS 46 to describe the opportunities for advertisements, and CIS 48 to describe the content. At step 68, an ADS 50 receives the POIS data from the POIS 46 and makes a decision about which ads to import. At step 70, the ADM 52 takes the output of the ADS 50 and streams it along with the content pushed over the CIS 48. At step 72, the ADM 52 delivers the playlist 44 to the user 56.

With regard to ingesting content in step 60, content is currently defined as an ADI1.1, ADI2.0, or SCTE-118 package containing all metadata needed to describe media assets, such as an episode of a television series, a movie, or a sports highlight reel. In the MetaMore system system, this content is one of the core components, along with placement opportunities, of playlists (to be described hereinbelow). The MetaMore system uses the Digital Program Insertion Advertising System Interface's CIS messaging and data type specification, known as SCTE-130 part 4, for ingesting content into the system.

To ingest asset metadata, the MetaMore system listens for CIS content notification messages with an ADI1.1 payload from ADI 1.1/2.0 40. If the notification is considered to be an envelope, the contents of the notification are contained in an extension element, and the ADI information is enclosed within that element. When a notification comes in from ADI 40, the MetaMore system processes the payload. The MetaMore system takes the asset package, and parses it to break it down into individual assets (multiple assets may come in with one payload). Each of individual assets is then persisted to the MetaMore system's database, and become available for use in the system. A CIS notification acknowledgement is sent from the CIS 48 to the ADI 40 upon successful receipt of a payload. If no payload was contained within the CIS message, an error message is sent back.

Ad Units are created by the MetaMore system as the initial construct in support of a placement opportunity. Ad units are defined by duration, interactivity, and the number of subdivisions available. After the system operator has logged into the MetaMore system and selects "New Ad Unit" from a "New" drop down menu, a "New Ad Unit" screen 74 as shown in FIG. 6 is displayed to a system operator. The "New Ad Unit" screen 74 includes fields for Description 76, Duration 78, Number of Opportunities 80, Interactivity 82, Overlay 84, Location 86, Start Date 88, End Date 90, Scope 92, Save Button 94, and Cancel Button 96. Table 1 displays columns for the field name, whether or not the field is required, and the field definition and possible parameter values as follows:

TABLE 1

| Item | Required? | Description |
| --- | --- | --- |
| Description | N | User specifies a description by which to refer to the ad unit. E.g., 30 second fixed. Max 256 characters. |
| Duration | Y | This indicates the total duration of the ad unit regardless of the number of opportunities (see below). Either fixed or flexible. Default to fixed. If Fixed is selected, the duration box underneath it is active and the rest are inactive. If Flexible is selected, the three duration boxes underneath are active, and the one under Fixed is inactive. Defaults are as follows: Fixed: 30 Flexible Min: 0 Flexible Max: 60 Flexible Best: 30 |
| Number of Opportunities | Y | This indicates the number of opportunities that may be created within the ad unit. Either Fixed or Flexible. See rules for enabling/disabling duration selectors above. Defaults are as follows: Fixed: 1 Flexible Min: 1 Flexible Max: 6 Flexible Best: 3 |
| Interactivity | Y | Specifies the type of interactivity available on the ad unit: None (default) -> note that Select, although displayed in the screenshot, is not an available option. RFI Bookmark Commerce |
| Overlay | Y | Specifies the type of overlay offered: None (default) -> note that Select, although displayed in the screenshot, is not an available option. Bug L-shaped squeeze C-shaped squeeze U-shaped squeeze |
| Location | Y | The location of the ad unit in its order in the playlist. Selections include: Any Always First |

TABLE 1-continued

| Item | Required? | Description |
|---|---|---|
| | | Always Last |
| | | If Any is selected, the ad unit may be inserted everywhere. |
| | | If Always First is selected, the ad unit may only be inserted as a pre-roll. |
| | | If Always Last is selected, the ad unit may only be inserted as a post-roll. |
| Start Date | Y | The date on which the ad unit becomes active for use. Cannot be in the past. |
| End Date | Y | The date on which the ad unit expires. Cannot be in the past. Must be after the Start Date by at least one day. |
| Scope | Y | The location where the ad unit may be broadcast. Until specific location functionality is developed, this dropdown has one selection: National, and it is selected by default. |
| Save Button | | Saves the Ad Unit to the system. Validate that Description is unique. |
| Cancel Button | | Cancels without saving changes. |

When ad units are coupled with distribution rules such as a category path, the Ad units become placement opportunities, i.e., placements that may be filled with advertisements that meet the rules specified by that placement and representing the pre-rolls 14, post-roll 18, interstitials 16, and pauses 20 for VOD of FIG. 2, which are fed to the ADS 50 of FIG. 4 for decisions about which ads are to be inserted into the placement opportunities.

Placement Opportunities inserted into the playlists 44 need be provided with the data points as listed in Table 2:

TABLE 2

| Field | Description |
|---|---|
| Name | Common name. Must be unique. |
| Description | Expanded description. |
| Interactivity | Valid values are |
| | RFI |
| | Telescope |
| | Bookmark |
| | Commerce |
| | None |

TABLE 2-continued

| Field | Description |
|---|---|
| Overlay | Valid values are |
| | Bug |
| Best Duration | The optimal duration, in seconds |
| Min Duration | The minimum duration, in seconds |
| Max Duration | The maximum duration, in seconds |
| Subdivisions | Integer representing the number of times a PO unit may be divided. Must be at least 1. |

With regard to creating the playlist 44, the system operator selects "New Ad Unit" from a "New" drop down menu, a "Playlist: Rules" screen 98 as shown in FIG. 7 is displayed to the system operator. The "Playlist: Rules" screen 98 includes fields for Name 100, Description 102, Status dropdown 104, Active Date 106, Expiry Date 108, Cat Path Selector 110, Markets dropdown 112, Devices checkbox 114, Ad Units checkbox 116, Interstitial Checkbox 118, Trick Play Option 120, Pause Option 122, Bitrate 124, Save button 126, and Reset button 128. Table 3 displays columns for the field name, whether or not the field is required, and the field definition and possible parameter values as follows:

TABLE 3

| Item | Required? | Description |
|---|---|---|
| Name | Y | User specifies a name for the Playlist. Spaces allowed. Max length 128 chars. |
| Description | N | User specifies a description for the Playlist. Max length 1028 chars. |
| Status dropdown | Y | Entries available are Draft, Ready, Approved, Revisable. Default selection is Draft. Revisable is programmatically determined and is not visible to the user, but may be set and displayed by the system. |
| Active Date | Y | User specifies a date on which the playlist becomes active. Default is blank. Do not allow dates in the past. Functionality will depend on date control selected. |
| Expiry Date | Y | User specifies a date on which the playlist will expire. Do not allow dates in the past. Functionality will depend on date control selected. |
| Cat Path Selector | Y | Initially offers a simple, list-based category path selector. Category Path on broadcast rules refers to the category path to where the playlist should live in the EPG. |
| Markets dropdown | Y | User specifies markets to which the playlist is to be broadcast. Default is National. Other entries may be configured by the client. |
| Devices checkbox | N | User specifies devices on which the playlist is playable. If "All set-tops" is checked, check all four set-top entries. If "All Broadband" is checked, check all four broadband entries. |

TABLE 3-continued

| Item | Required? | Description |
|---|---|---|
| | | If the user then unchecks one of the four sub-items in either list, uncheck the top item. (e.g., if user unchecks Sony, uncheck All Set-tops). These are default selections. Clients may choose to configure these lists. |
| Ad Units checkbox | Y | User specifies whether ad units may be included in the playlist. Checked by default. |
| Interstitial Checkbox | Y | User specifies whether interstitials are allowed in the playlist. For M0, this is unchecked by default and not functional. |
| Trick Play Option | Y | User specifies whether trick play is allowed on the playlist, on the content, or not at all. On Playlist is selected by default. |
| Pause Option | Y | User specifies whether pause is allowed on the playlist, on the content, or not at all. On Playlist is selected by default. |
| Bitrate | N | Provides a list of available bit rate constraints. May be configured by the client. |
| Save button | | On Click: Validates the playlist. Saves it to the system. Opens the Ad/Remove Items tab with the playlist name visible. |
| Reset button | | On Click: Reset always reverts to the previously saved version of the playlist. If there is no previously saved version, Reset clears all settings on the page. |

Figure 8:
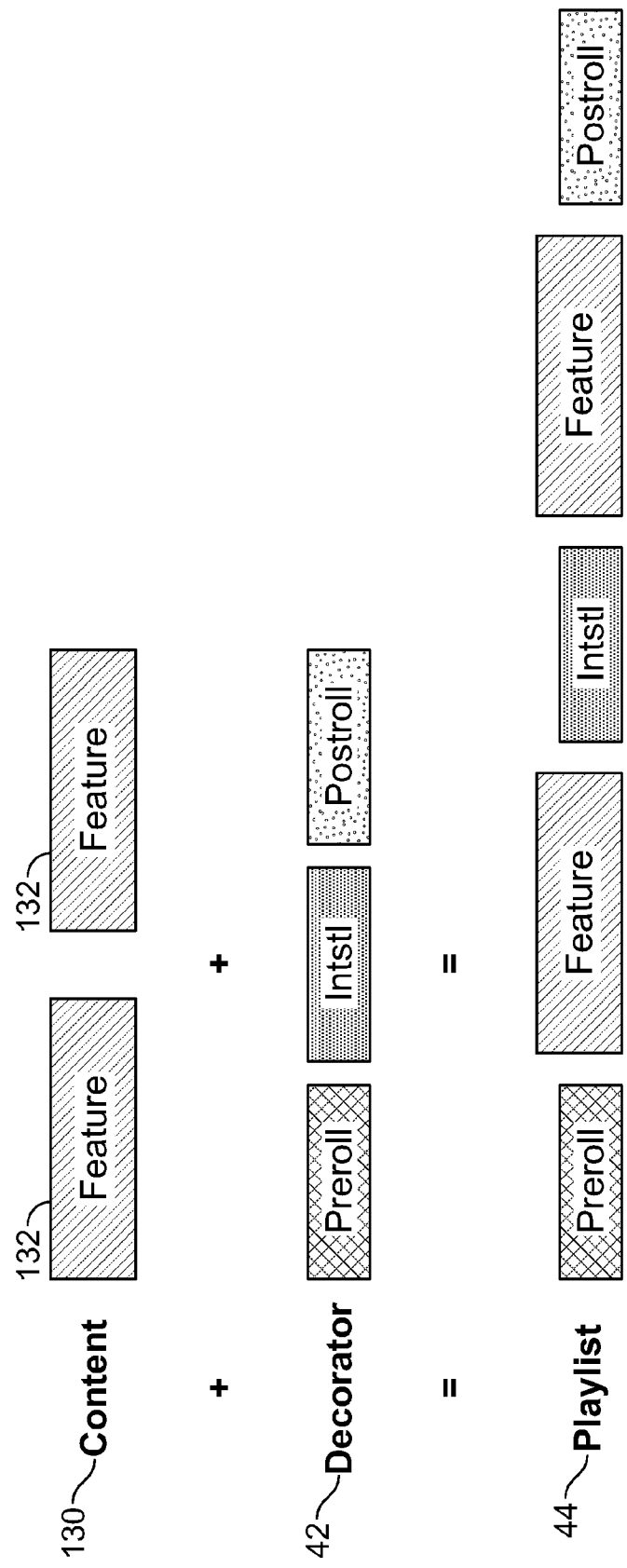
FIG. 8 is a block diagram depicting the construction of a playlist according to an embodiment of the present invention, in accordance with an embodiment of the present invention.

With regard to creating a playlist decorator 42 as described in steps 62 of FIG. 5, the decorator 42 comprises one or more placement opportunities. Playlist decorators 42 and playlists 44 are linked to trigger assets using the ADI metadata field Category Path. When a service call (a service call is a request for information from the ADM or ADS to CIS/POIS/SIS. In this case, the service call asking for what content and/or opportunities and/or ads are required to be streamed for a VOD request) requests the playlist 44 for a specified trigger asset, the MetaMore system parses the service call to identify its category path and then looks to see if there is already a decorator for that category path. If there is, the MetaMore system pieces together the playlist and its decorator as shown in FIG. 8. The content 130, which comprises a plurality of feature segments 132, such as segments of a given television show, is separated and combined with the decorator 42, which may be a pre-rolls 14, post-roll 18, interstitials 16 (see FIG. 3). The system loops to correctly insert the pre-rolls 14 before the content 130, interstitials 16 therebetween, and the post-rolls 18 after the content 130. The output is the playlist 44. If there is no decorator, the MetaMore system outputs the content 110 as a playlist with 0 placement opportunities.

Decorators are defined in two stages. The first stage defines which ad units comprise the decorator as shown in Table 4:

TABLE 4

| Field | Description |
|---|---|
| Ad Unit Type | Declares the type of ad unit and where it falls in the content list. Supported values are: preRoll interstitial postRoll midRoll scheduled pod scheduled cue signal |
| Ad Unit Name | The name of a previously defined ad unit. |

The second stage of decorator creation associates a decorator with category paths as shown in Table 5:

TABLE 5

| Field | Description |
|---|---|
| Decorator Name | The name of the defined decorator. |
| Category Path Name | Category path name to associate with the decorator. |

An example of creating a playlist decorator is illustrated in tables 6 and 7:

TABLE 6

Step 1 - create the decorator
[2 Ads Decorator.xls]

| Ad Unit Type | Ad Unit Name |
|---|---|
| preRoll | 15-Second Pre-Roll |
| postRoll | 30-Second Post-Roll |

The example in Step 1 creates a decorator called "2 Ads Decorator" with two ad units.

TABLE 7

Step 2 - assign the decorator
[2 Ads Decorator Assignment.xls]

| Decorator Name | Category Path Name |
|---|---|
| 2 Ads Decorator | /New Release/ |
| 2 Ads Decorator | /Movies A-Z/ |

The example in Step 2 associates the "2 Ads Decorator" with two category paths. Decorators are created without a user interface.

The playlist 44 comprises name, description, and rules about where and how it will be viewed. Playlist creation is generally a user task. Once the playlist 44 has been created and saved, a system operator may add assets that have been ingested through the CIS 48 as either content assets or trigger assets. Content assets are core assets that will be played out when the playlist 44 is requested over its delivery channel (for example, a user watching video on demand may request a "Batman doubleheader." This could be a playlist consisting of Batman I and II, with a 60 second interactive ad between the two features). Trigger assets are assets that need be in the playlist to trigger the release of the assets to the user. A trigger asset may be simply one second of black or it may be one of the assets already in the playlist 44 or it may be some other asset. It is up to the playlist requestor (i.e., the system operator) to specify how the trigger assets should work.

Figure 9:
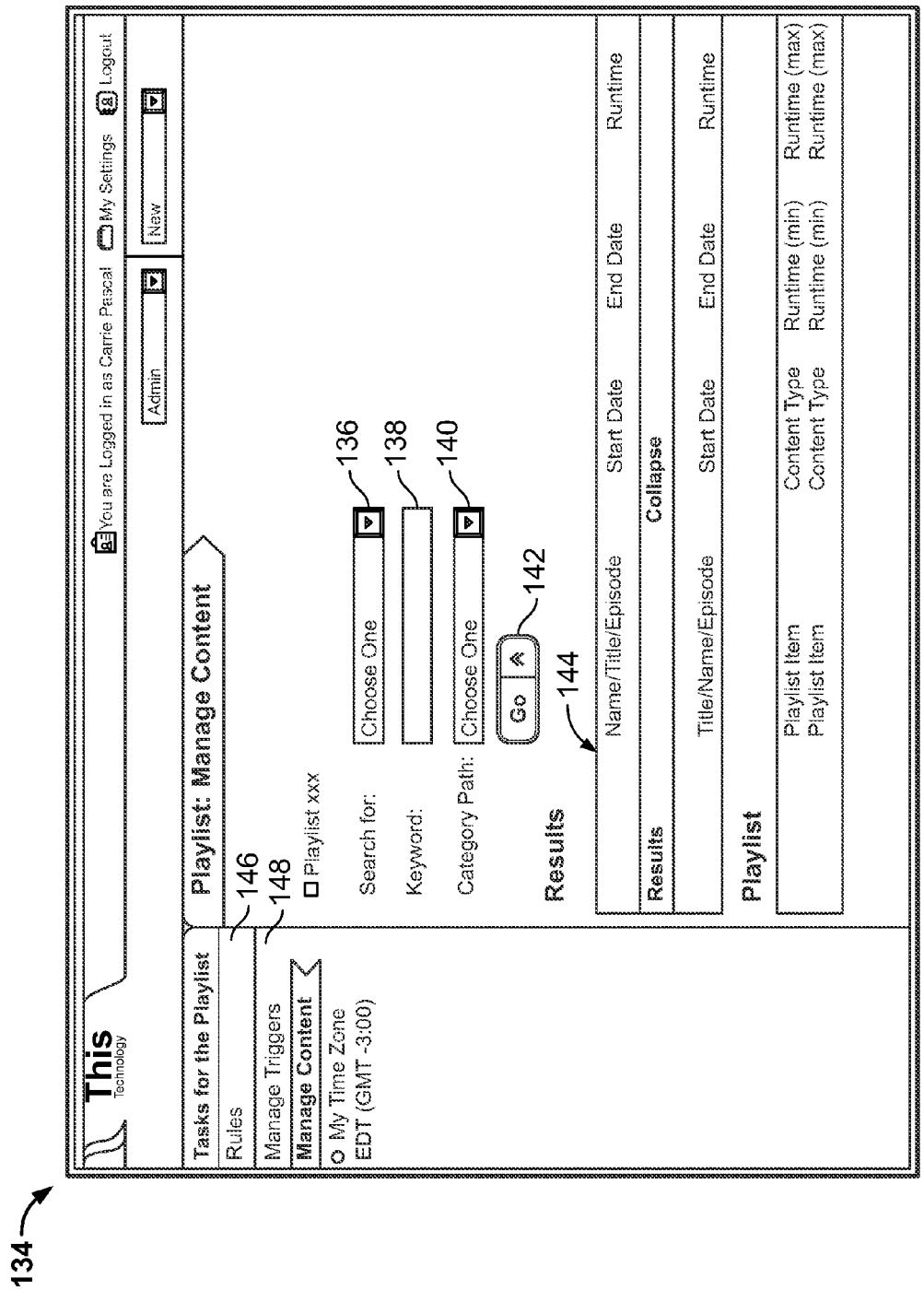
FIG. 9 is a screen shot of a "Manage Content" screen that is displayed to a system operator, in accordance with an embodiment of the present invention.

To add content assets (content) to a playlist, the system operator will have arrived at a "Manage Content" screen 134 as shown in FIG. 9 by creating a new playlist and saving it after filling out the form on the "Playlist:Rules" screen. Note the "Manage Content" screen 134 is selected in the left pane. Note also that the "Playlist Saved" message appears at the top of the screen 134, to indicate that the playlist has been successfully saved. The "Manage Content" screen 134 includes a "Search For:" Dropdown Menu 136 and fields for Keyword 138, Category Path Selector 140, Go button 142, Search Results 144, Rules tab 146, and Manage Triggers tab 148. Table 8 displays columns for the field name and the field definition and possible parameter values as follows:

is created, the playlist 44 goes into a draft state, and then the system operator may move it to an approved state which indicates that the playlist 44 is ready to be published. The MetaMore system makes use of a daemon that periodically searches for playlists in the approved state. If found, each of such approved playlists 44 are published—meaning all of their information is output into a playlist definition. The playlist definition outputs an ADI1.1 "movie" comprising asset information which includes a provider ID and an asset ID, along with playlist rules that have been specified by the system operator. Playlist output is an ADI2.0 package that includes some ADI1.1 references: the ADI2.0 group asset contains playlist metadata assets that may reference ADI1.1 assets.

With regard to publishing the playlist 44 in step 66 of FIG. 5, although the playlist 44 is a single entity, after it is pieced together it is then distributed to different systems:

The content or features are distributed via the CIS 48
The placement opportunities are distributed via the POIS 46 (to be described hereinbelow).

TABLE 8

| Item | Descriptions |
| --- | --- |
| "Search For:" Dropdown | This dropdown contains three entries:<br>Content<br>Ad Units<br>Both<br>The first time this page loads, Content is selected by default. This indicates that the filters displayed are relevant to a Content search.<br>On subsequent loads of this page, remember this dropdown setting. |
| Keyword | Entering a keyword (or multiple keywords, comma separated) filters the list of search results by the keyword typed. |
| Category Path Selector | This allows the user to select a category path to filter results/<br>See details in CatPath selector for broadcast rules.<br>This ads a category path filter to the content results pane. |
| Go button | After selecting content filters, the user clicks the Go button. This updates the search results pane to display the assets that meet the criteria specified.<br>To alter the search results, the user may re-select any of the filters and click Go again. |
| Search Results | Search results should match the criteria set for keyword(s) and category path(s) (both of which are OR constructs). Additionally, for M0, search results need to be constrained by the active and expiry dates set on the broadcast rules for the playlist.<br>For example:<br>Active date = 08/01/08, Expiry date = 10/01/08<br>Content start date must be on or after 08/01/08<br>Content end date must be on or before 10/01/08. |
| Rules tab | On Click:<br>Open the broadcast rules tab. |
| Manage Triggers tab | On Click:<br>Open the manage triggers tab. |

Figure 10:
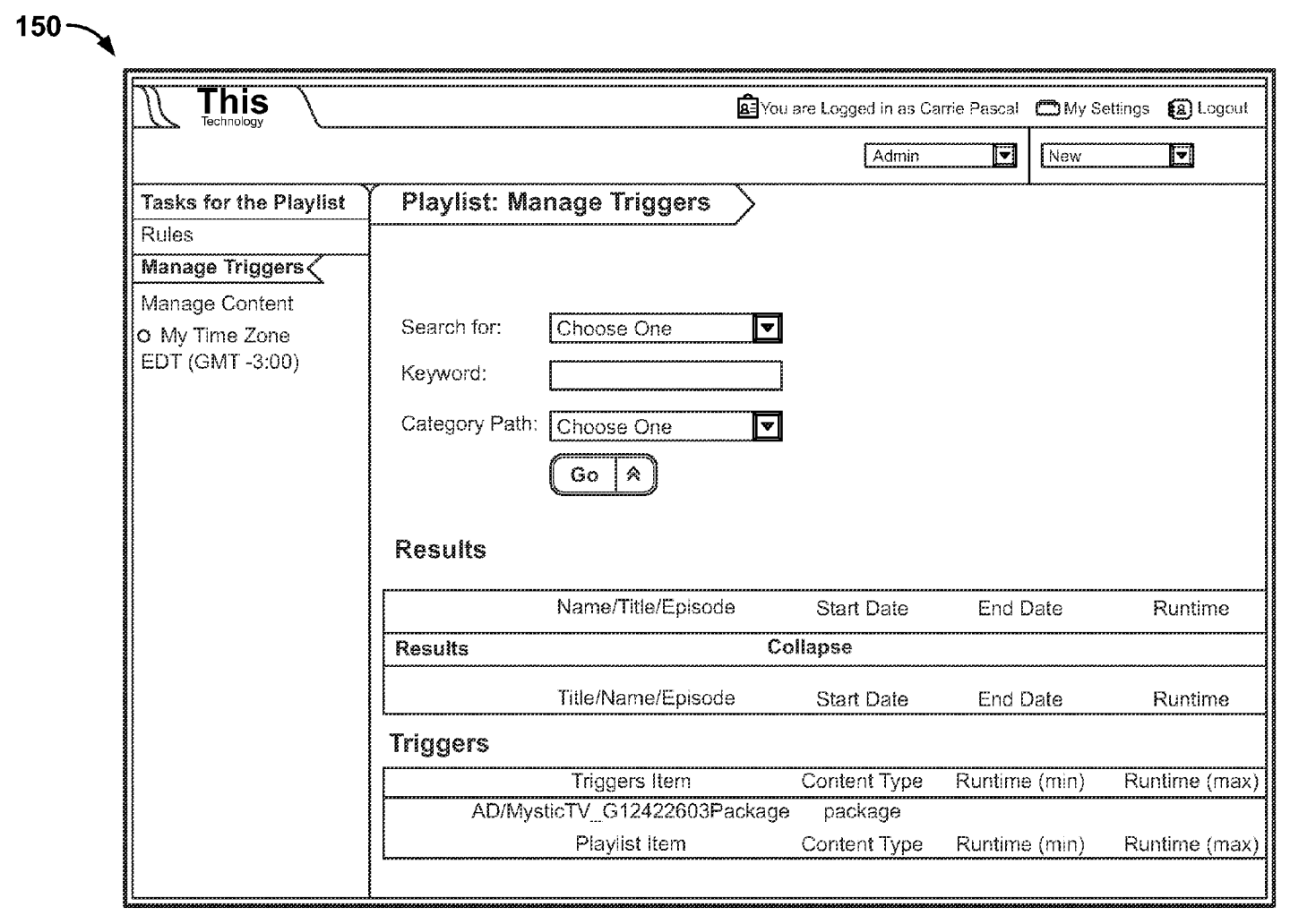

To add Trigger assets (triggers) to a playlist, the system operator will have selected "Manage Triggers tab" 148 on the "Manage Content" screen 134, which then displays a "Manage Triggers" screen 150 shown in FIG. 10. Trigger assets are assigned according to the following rules:

Each playlist must have one or more trigger assets.
The trigger asset does not have to be a member of the playlist.
Each asset may only be used as a trigger asset once.
If a playlist contains only assets that cannot be used as triggers (because they have already been used), then that playlist cannot be published.
If no trigger asset is set for the playlist then the playlist cannot be published.

Referring again to FIG. 4, the MetaMore system supports light workflow to ensure that the playlist 28 noes through the proper channels before it is published and received by the next sub-system that needs to process them. When the playlist 44

The playlist may be published by insertion directly into ADI.

The ADS 50 may read the POIS 46 and make decisions as to which units are filled with certain ads. Then, in step 70, the ADM 52 reassembles the playlist 44 and prepares the playlist 44 for playout to the user 58.

The MetaMore system implements the POIS 46 compliant with SCTE-130 Parts 1-8. The POIS 46 holds, maintains, and retains descriptions of content placement opportunities (typically for advertisements) and provides the query interfaces and notifications for those opportunities. The POIS 46 contains features, attributes and constraints for each placement opportunity, compliant with platform, rights, and policies including those of the content in which it exists. These placement opportunities are content specific; therefore, attributes and constraints may vary by network, geographic region, or other content distribution dimension. The POIS 46 defines the standardized interface for accessing the placement opportunity information. The POIS 46 uses ADI2.0 and therefore needs to provide a mapping from ADI1.1 to ADI2.0. In one embodiment, The MetaMore system ingests ADI1.1, transform it (with field mapping), and output ADI2.0.

Figure 11:
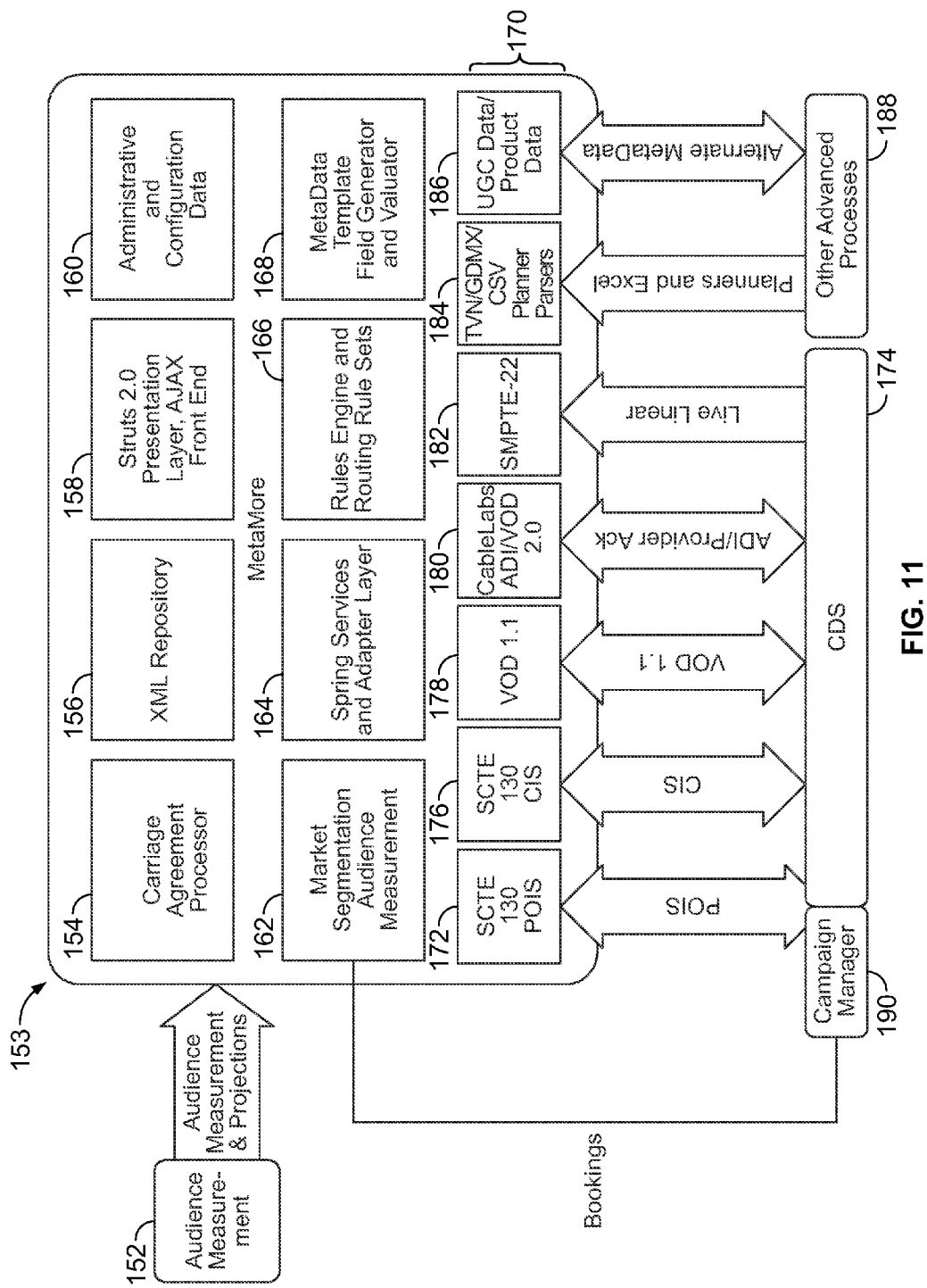
FIG. 11 is a block diagram of the MetaMore system software architecture, constructed in accordance with an embodiment of the present invention.

FIG. 11 depicts the high level software architecture of the MetaMore system and its interactions with external interfaces. One external interface is an audience measurement module 152 which is a ratings service such as Nielson, which provides audience measurements and projection statistics. For any given market segment, the audience measurement module 152 provides the number of expected video data streams. For example, the number of video streams for the month of November for boys 14-19 should be 80,100, for girls 14-19, it should be 30,000, etc.

Within the MetaMore system software architecture 153, the Carriage Agreement processor 154, specifies an agreement as to which entity owns particular portions of inventory, between the cable operator or service provider and a content provider such as a cable network. The Carriage Agreement processor 154 encodes rules and definitions, preferably in XML. Typical rules may specify, for example, that a cable operator may own two minutes of streaming per hour and a content provider owns ten minutes per hour.

The MetaMore system software architecture 153 includes an XML Repository 156 for managing content properties and advertisement opportunity properties. These properties are stored as XML objects in preferably a relational database. A Struts 2.0 Presentation Layer/Ajax Front End module 158 is the user interface module for presenting a graphical user interface to a system operator. The graphical user interface provides the screens and processes input described above for allowing the system operator to edit rules, edit data, manage data, and publish data.

An Administrative and Configuration Data module 160 manages the permissions associated with users, organization, and geographic regions. For example, permissions are created which specify that a user who is managing the advertising space for Disney should not be able to see the advertising space for Nickelodeon. A user who has permission to mange the Northwest region of the United States should not be able to manage the Southwest region of the United States.

A Market Segmentation Audience Measurement module 162 delineates groupings of market segments as the name implies, e.g., boys 14-19.

A Spring Services module 164 is an adaptive layer, freely available on the Internet, that handles all back end messages so that the messages may be accepted and validated. The messages may proceed through an electronic workflow, respond to Web services, and may be processed. The Spring Services module 164 is the means by which messages may be sent to and received from the Internet by bootstrapping messages into a service that may be made available on the Internet.

A Rules Engine 166 is a freely available software package that processes business cases against rules. Rules Engine 166 implements the placement opportunity decisions and actions discussed previously in the form of routing rules sets. Rules and routing rules sets assert placement opportunity decisions in the forms of objects, which produce user defined outcomes. The Rules Engine 166 behaves similarly to a very large "switch-case" statement, wherein each case in the switch-case statement implements a rule. Rules may be grouped into routing rules sets or may be individual rules. The rules are not fixed at run time, and may be changed "on-the-fly" by means of entering data into the menus at the user interface described above. For example, a rule may specify that a content provider wants permission to have a 30 second pre-roll at the beginning of a video stream. Then, after entering new data at the user interface, the rules may be changed to specify that the same content provider wants 45 second pre-rolls before every piece of content in the data stream. When a rule is added or changed, the new rule is checked against the carriage agreement in the Carriage Agreement processor 154 to see if this new type of rule is permissible. For example, a current rule specifies that a content provider wants a 45 second pre-role but the current rule specifies 30 second pre-rolls everywhere in the United States. If the carriage agreement in the Carriage Agreement processor 154 does not prohibit such changes, then the market specific rule is added to the "switch-case" of the Rules Engine 166.

The MetaData Template Field Generator and Validator 168 translates rules such as placement opportunities, sequencing in playlists, and other characteristics of the video data or of the user such as the remote control device and set top box the user is using into metadata in the form of XML messages that are added to the playlists before sending out the video data stream. Incoming metadata from a video stream is also validated using XML schemas. The MetaData Template Field Generator and Validator 168 also includes internal templates for translating one version of incoming metadata to another version for out-going metadata.

The lowest level row 170 of modules in the MetaMore system software architecture 153 include standard interfaces for interacting with video cable system equipment and processing systems. An SCTE-130 POIS 172 is the placement opportunities information service which communicates with an external content delivery service (CDS) 174 to specify placement opportunities as discussed above. An SCTE-130 CIS 176 is the content information service discussed above for specifying the input and output of content. A VOD1.1 module 178 and CableLabs ADI/VOD 2.0 package 180 are modules for interfacing with streams that may include video-on-demand features. An SMPTE-22 module 182 is a package which interacts with the CDS 174, and a TVN/GDMX/CSV Planner Parser module 184 and a UGC Data/Product Data module 186 interface with external Advanced Processes 188. The modules 182, 184, 186 manage when content may be made available for scheduling placement opportunities. The external Campaign Manager 190 comprises a traffic and billing system to be used by the MetaMore system software modules.

FIG. 12 depicts the high level hardware architecture of the MetaMore system 192 and its interactions with external systems, constructed in accordance with an embodiment of the present invention. The MetaMore system 192 may comprise a plurality of servers. These servers are configured to include a SpotBuilder User Interface server 194, a MetaMore system Rules Engine server 196, a MetaMore system Webservices server 198, and a MetaMore system DB server 200. Each of the servers 194-200 are configured to comprise a computing platform which may include a personal (x86) computer or work-station comprising one or more processors and a computer readable medium for storing the instructions of the system 192 to be executed by the one or more processors, including an operating system, such as the Windows or the Linux operating system. The computer readable medium(s) may include a combination of volatile memory, such as RAM memory, and non-volatile memory, such as flash memory, optical disk(s), and/or hard disk(s). In other embodiments, the system 192 may be implemented on a single personal computer/workstation comprising one or more single or multiple core processors and one or more computer readable mediums.

The system 192 implements the software architectural modules introduced in FIG. 11. For example, the SpotBuilder User Interface server 194 implements Struts 2.0 Presentation Layer/Ajax Front End module 158, the Carriage Agreement processor 154, and the Market Segmentation Audience Measurement module 162. The MetaMore system Rules Engine server 196 implements the Rules Engine 166 and the MetaData Template Field Generator and Validator 168. The MetaMore system DB server 200 implements the XML Repository 156. The MetaMore system Webservices server 198 implements the Spring Services module 164 and all of the rest of the standard interfaces in the lowest level row 170 of modules in the MetaMore system software architecture 153 of FIG. 10 as web services, including drivers for communicating with an Asset and Schedule Management Systems 202, an Advertising Campaign Management Systems 204, and a Video Distribution Systems 206. The MetaMore system Webservices server 188 also implements drivers for communication between the lower level row 170 of modules and the systems 202-206, including requests for information from the systems 202-206 to the system 153 and drivers for converting web services messages into internal database or rules language.

In general, the system 192 does not directly operate on video streams emanating from the Video Distribution systems 206, but inform the systems 202 and 204 of placement opportunities for advertisements to be inserted into the video data streams by the Video Distribution systems 206. The Schedule Management Systems 202 are systems that are aware of the schedule of programs within a cable broadcast system and is configured inform the system 192 as to the times of breaks in the scheduled video streams. The Schedule Management Systems 202 provide live video streams and VOD assets to the Video Distribution Systems 206. For example, the Schedule Management Systems 202 would be aware of what NBC is currently broadcasting and would broadcast at a later time or date, and would inform the Video Distribution Systems 206 that the program "Lost" comes before "Friends" and the following are the locations in the streams for breaks for placement opportunities as received from the system 192. The Advertising Campaign Management Systems 204 accepts advertising campaigns including advertising space rules and descriptions for sale from the system 192, and converts series of campaign Ads from advertisers into a series of instructions to inform the Video Distribution Systems 206 that the following are the ads to be placed in the placement opportunities identified by the system 192. The system 192 receives information from the Video Distribution Systems 206 of the currently scheduled video streams and receives instructions as to the time and duration of placement of real time placement opportunities and real time advertisement decisions from the from the Advertising Campaign Management Systems 204.

It is to be understood that the exemplary embodiments are merely illustrative of the invention and that many variations of the above-described embodiments may be devised by one skilled in the art without departing from the scope of the invention, it is therefore intended that all such variations be included within the scope of the following claims and their equivalents.

What is claimed is:

1. A method, comprising:
   processing, by a processor, instructions to customize a pre-existing datastream;
   identifying, by the processor, at least one time interval for a placement opportunity in the datastream;
   dynamically defining, by the processor, on a per-subscriber basis the placement opportunity in accordance with the instructions and altering the at least one time interval for the placement opportunity based on one or more rules defining ownership and interactive rights that specify which entity owns one or more portions of the at least one time interval for the placement opportunity;
   assembling, by the processor, the dynamically defined placement opportunity and the altered at least one time interval for the placement opportunity into a playlist that represents a customized datastream on a per-subscriber basis; and
   delivering, by the processor, the playlist to a distribution system.

2. The method of claim 1, wherein the at least one time interval for the placement opportunity is distinct from the at least one time interval for content.

3. The method of claim 1, wherein the at least one time interval for the placement opportunity is coincident with at least one time interval for content.

4. The method of claim 1, wherein the placement opportunity is at least one of content or an advertising placement opportunity.

5. The method of claim 1, wherein the content is entertainment content.

6. The method of claim 5, wherein the entertainment content comprises at least one of video, audio, or interactive overlays.

7. The method of claim 1, wherein dynamically defining on a per-subscriber basis the placement opportunity and altering the at least one time interval further comprises altering the duration of the at least one time interval for the placement opportunity.

8. The method of claim 1, wherein dynamically defining on a per-subscriber basis the placement opportunity and altering the at least one time interval further comprises altering the number of the at least one time interval for the placement opportunity.

9. The method of claim 1, wherein dynamically defining on a per-subscriber basis the placement opportunity and altering the at least one time interval further comprises altering at least one of an overlay real estate or sales relationships of the at least one time interval for the placement opportunity.

10. The method of claim 1, wherein altering further comprises at least one of changing, adding to, or subtracting from the at least one time interval for the placement opportunity.

11. The method of claim 1, wherein altering the at least one time interval is based on one of different markets, the nature of the content, from where the content is being accessed, the type of devices employed by a specific subscriber, time of day, day of the week, geographic area, or demographic profile.

12. The method of claim 1, wherein the at least one time interval for the placement opportunity corresponds to one of breaks, entertainment content, pre-rolls, post-rolls, mid-rolls, interstitials, pauses, or video-on-demand requests.

13. The method of claim 1, further comprising inserting a decorator for housing placement opportunities that may be matched to content about the content to create the playlist.

14. The method of claim 1, further comprising publishing the playlist.

15. The method of claim 14, wherein publishing the playlist comprises transmitting the playlist to one of a content information service (CIS) that conforms to the SCTE-130 standard or a placement opportunity information service (POIS) that conforms to the SCTE-130 standard.

16. The method of claim 1, further comprising informing the distribution system to stream the altered datastream.

17. The method of claim 1, wherein the at least one placement opportunity is destined for one of video-on-demand based advertising, linear based advertising, rotation groups, or subscriber-based addressing for advertising or content tailoring.

18. The method of claim 1, wherein the distribution system is a video distribution system.

19. The method of claim 1, wherein the datastream is intended for television transmission.

20. An apparatus, comprising:
a memory;
a processor operatively coupled to memory, the processor to:
   process instructions to customize a pre-existing datastream;
   identify at least one time interval for a placement opportunity in the datastream;
   dynamically define on a per-subscriber basis the placement opportunity in accordance with the instructions and altering the at least one time interval for the placement opportunity based on one or more rules defining ownership and interactive rights that specify which entity owns one or more portions of the at least one time interval for the placement opportunity;
   assemble the dynamically defined placement opportunity and the altered at least one time interval for the placement opportunity into a playlist that represents a customized datastream on a per-subscriber basis; and
   deliver the playlist to a distribution system.

21. The apparatus of claim 20, wherein the at least one time interval for the placement opportunity is distinct from the at least one time interval for content.

22. The apparatus of claim 20, wherein the at least one time interval for the placement opportunity is coincident with at least one time interval for content.

23. The apparatus of claim 20, wherein the placement opportunity is at least one of content or an advertising placement opportunity.

24. The apparatus of claim 20, wherein dynamically defining on a per-subscriber basis the placement opportunity and altering the at least one time interval further comprises altering the duration of the at least one time interval for the placement opportunity.

25. The apparatus of claim 20, wherein dynamically defining on a per-subscriber basis the placement opportunity and altering the at least one time interval further comprises altering the number of the at least one time interval for the placement opportunity.

26. The apparatus of claim 20, wherein altering further comprises at least one of changing, adding to, or subtracting from the at least one time interval for the placement opportunity.

27. A non-transitory computer-readable storage medium including instructions that, when accessed by a processor, causes the processor to perform operations, comprising:
   processing, by the processor, instructions to customize a pre-existing datastream;
   identifying, by the processor, at least one time interval for a placement opportunity in the datastream;
   dynamically defining, by the processor, on a per-subscriber basis the placement opportunity in accordance with the instructions and altering the at least one time interval for the placement opportunity based on one or more rules defining ownership and interactive rights that specify which entity owns one or more portions of the at least one time interval for the placement opportunity;
   assembling, by the processor, the dynamically defined placement opportunity and the altered at least one time interval for the placement opportunity into a playlist that represents a customized datastream on a per-subscriber basis; and
   delivering, by the processor, the playlist to a distribution system.

28. The non-transitory computer-readable storage medium of claim 27, wherein the at least one time interval for the placement opportunity is distinct from the at least one time interval for content.

29. The non-transitory computer-readable storage medium of claim 27, wherein the at least one time interval for the placement opportunity is coincident with at least one time interval for content.

30. The non-transitory computer-readable storage medium of claim 27, wherein the placement opportunity is at least one of content or an advertising placement opportunity.

31. The non-transitory computer-readable storage medium of claim 27, wherein dynamically defining on a per-subscriber basis the placement opportunity and altering the at least one time interval further comprises altering the duration of the at least one time interval for the placement opportunity.

32. The non-transitory computer-readable storage medium of claim 27, wherein dynamically defining on a per-subscriber basis the placement opportunity and altering the at least one time interval further comprises altering the number of the at least one time interval for the placement opportunity.

33. The non-transitory computer-readable storage medium of claim 27, wherein altering further comprises at least one of changing, adding to, or subtracting from the at least one time interval for the placement opportunity.

34. A method, comprising:
   identifying, by a processor, at least one time interval for a placement opportunity in a pre-existing datastream;
   dynamically defining, by the processor, on a per-subscriber basis rules to customize the placement opportunity located in the pre-existing datastream, one or more of the rules defining ownership and interactive rights that specify which entity owns one or more portions of the at least one time interval for the placement opportunity;
   assembling, by the processor, the dynamically defined rules to customize the placement opportunity and the at least one time interval for the placement opportunity into a playlist that represents a customized placement opportunity on a per-subscriber basis; and
   delivering, by the processor, the playlist to a distribution system.

* * * * *